(12) United States Patent
Chen et al.

(10) Patent No.: US 10,409,056 B2
(45) Date of Patent: Sep. 10, 2019

(54) DISPLAY SYSTEM

(71) Applicants: National Chiao Tung University, Hsinchu (TW); LIQXTAL TECHNOLOGY INC., Tainan (TW)

(72) Inventors: Hung-Shan Chen, Taichung (TW); Yi-Hsin Lin, Zhubei (TW)

(73) Assignees: LIQXTAL TECHNOLOGY INC., Tainan (TW); NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 15/979,201

(22) Filed: May 14, 2018

(65) Prior Publication Data

US 2018/0259769 A1 Sep. 13, 2018

Related U.S. Application Data

(60) Division of application No. 14/689,919, filed on Apr. 17, 2015, now abandoned, which is a continuation-in-part of application No. 13/828,723, filed on Mar. 14, 2013, now abandoned.

(30) Foreign Application Priority Data

Feb. 7, 2013 (TW) .............................. 102104728 A

(51) Int. Cl.
*G02F 1/29* (2006.01)
*G02B 27/00* (2006.01)
*G02B 3/00* (2006.01)
*G02B 17/08* (2006.01)
*G02B 27/01* (2006.01)

(52) U.S. Cl.
CPC ....... *G02B 27/0025* (2013.01); *G02B 3/0087* (2013.01); *G02B 17/0856* (2013.01); *G02B 27/0172* (2013.01); *G02F 1/29* (2013.01); *G02F 2001/294* (2013.01)

(58) Field of Classification Search
CPC .................................................. G02B 27/0025
See application file for complete search history.

(56) References Cited

U.S. PATENT DOCUMENTS

| 2005/0248705 A1 | 11/2005 | Smith et al. |
| 2007/0127348 A1 | 6/2007 | Ooi et al. |
| 2007/0182915 A1 | 8/2007 | Osawa et al. |

(Continued)

FOREIGN PATENT DOCUMENTS

WO   WO 2011/132789 A1   10/2011

*Primary Examiner* — Sang V Nguyen
(74) *Attorney, Agent, or Firm* — Muncy, Geissler, Olds & Lowe, P.C.

(57) ABSTRACT

An optical system for aberration compensation comprising an optical module and an asymmetric refractive index distribution film is disclosed. The asymmetric refractive index distribution film comprises a liquid crystal and a liquid crystalline polymer, wherein the asymmetric refractive index distribution film set on an out-light surface or an in-light surface of the optical module. A display system comprising the above-mentioned optical system and an image panel are also disclosed herein. The asymmetric refractive index distribution film of the present invention has non-uniform refractive index distribution so as to effectively compensate the aberration formed by the optical module.

5 Claims, 23 Drawing Sheets

(56) References Cited

U.S. PATENT DOCUMENTS

| | | | |
|---|---|---|---|
| 2009/0316097 A1* | 12/2009 | Presniakov | G02F 1/29 349/129 |
| 2011/0027494 A1* | 2/2011 | Tan | B29D 11/0074 427/508 |
| 2011/0109824 A1 | 5/2011 | Galstian | |
| 2011/0262844 A1* | 10/2011 | Tabirian | G02B 5/3083 430/2 |
| 2012/0140128 A1 | 6/2012 | Lin et al. | |
| 2013/0107186 A1* | 5/2013 | Ando | G02C 7/083 349/153 |
| 2013/0188154 A1* | 7/2013 | Tomioka | G03B 21/008 353/31 |
| 2013/0201436 A1* | 8/2013 | Choi | G02F 1/133526 349/193 |
| 2013/0201437 A1* | 8/2013 | Choi | G02B 3/14 349/200 |
| 2014/0266990 A1* | 9/2014 | Makino | G02B 27/017 345/8 |

* cited by examiner

1

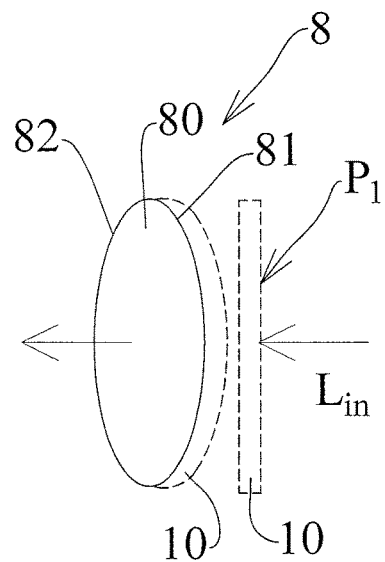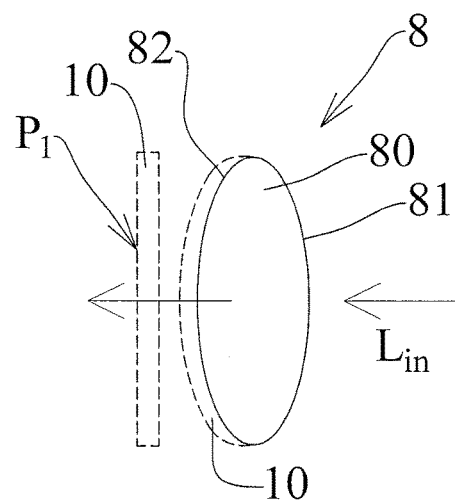
FIG.13A  FIG.13B
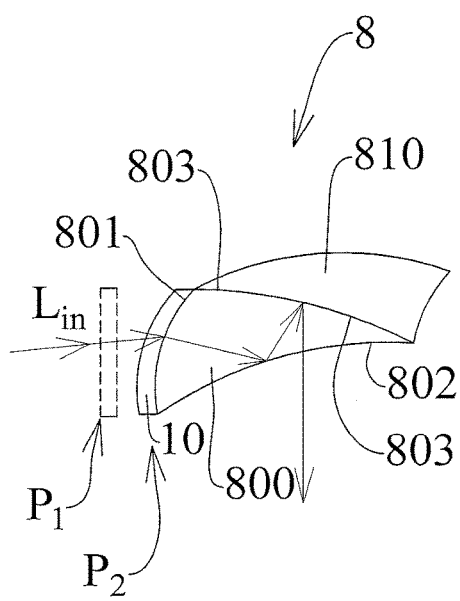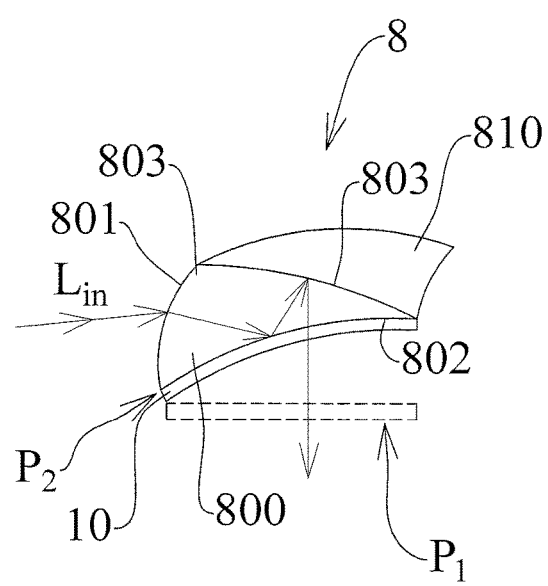
FIG.14A  FIG.14B

DISPLAY SYSTEM

CROSS-REFERENCE TO RELATED APPLICATION

This is a divisional of application Ser. No. 14/689,919, which is a continuation-in-part of application Ser. No. 13/828,723 filed in Mar. 14, 2013.

FIELD OF THE INVENTION

The present invention relates to an display system, and more particularly to a display system having a refractive index distribution film with non-uniform refractive index distribution.

BACKGROUND OF THE INVENTION

In general, the principle of designing a lens is to let a traveling light produce an optical path difference (thickness*refractive-index). Since the conventional spherical lens has a thickness increases with the optical power, therefore an improved method uses a Fresnel lens to divide the thickness into a smaller periodical structure was proposed. But the manufacture of the mold for the Fresnel lens is very complicated and relatively difficult, and the optical performance has the issues of a high chromatic dispersion and low diffraction efficiency. Therefore, conventional flat lenses such as glasses lenses achieve a change of the optical path difference by changing the refractive index distribution.

Wherein, the liquid crystalline polymer has the unique birefringence feature, and thus it can be used for the design of a flat lens. Since the liquid crystalline polymer also has the properties of dielectric anisotropy, therefore the electric field distribution can be applied to manufacture an electrically tunable liquid crystal lens. However, the present liquid crystalline polymer film only has the same refractive index distribution. In other words, each position of the liquid crystalline polymer film has the same focal length. Therefore, the present liquid crystalline polymer film with the design of a single focal length cannot be used freely with other lens. Due to the liquid crystalline polymer film having the design of a single focal length, additional components are required to change the refractive index distribution of the liquid crystal lens for manufacturing the electrically controlled liquid crystal lens.

SUMMARY OF THE INVENTION

The present invention is directed to a display system, the asymmetric refractive index distribution film having multi-segment or gradual variation of optical power is utilized to effectively compensate the aberration formed by the optical module.

To achieve another objective, the present invention provides a display system with an aberration compensation function comprises an optical system and an image panel. The optical system comprises a refractive index distribution film and an optical module. The refractive index distribution film comprises a liquid crystal and a liquid crystalline polymer, wherein a refractive index distribution of the refractive index distribution film is asymmetric and the tilt angle of the liquid crystal of the refractive index distribution film is fixed; the refractive index distribution film is arranged on a first side or a second side of the optical module; and the refractive index distribution film is utilized to compensate the aberration generated by the optical module. The image panel is utilized for displaying an image, wherein the image panel set on a light entrance side of the optical system, and the image light projected from the image panel passes through the optical system to a viewer's eyes.

In summation, the liquid crystalline polymer lens structure of the present invention has one or more of the following advantages:

(1) The liquid crystalline polymer film of the present invention is flexible, so that it can be used together with the lens as a simple lens sticker.

(2) The liquid crystalline polymer film of the present invention with a non-uniform refractive index distribution has the effect of correcting nearsightedness, farsightedness, presbyopia, parallax and compensating the aberration.

(3) The liquid crystalline polymer film of the present invention has a non-uniform refractive index distribution and after finishing the production, the tilt angle of the liquid crystal of the refractive index distribution film is fixed. Due to no additional electrically-controlled component is needed, the cost can be reduced substantially.

BRIEF DESCRIPTION OF THE DRAWINGS

FIG. 13A and FIG. 13B are schematic diagrams illustrating an optical system with an aberration compensation function in accordance with one embodiment of the present invention.

FIG. 14A and FIG. 14B are schematic diagrams illustrating an optical system with an aberration compensation function in accordance with one embodiment of the present invention.

DESCRIPTION OF THE PREFERRED EMBODIMENTS

Figure 1:
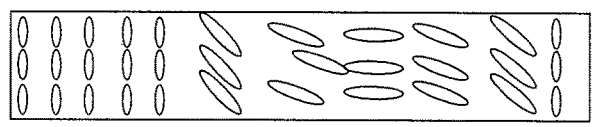
FIG. 1 is a schematic view of a refractive index distribution film of the present invention.
Figure 1:
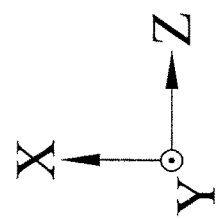

The technical characteristics, contents, advantages and effects of the present invention will be apparent with the detailed description of a preferred embodiment accompanied with related drawings as follows. The drawings are provided for the illustration, and same numerals are used to represent respective elements in the preferred embodiments. It is intended that the embodiments and drawings disclosed herein are to be considered illustrative rather than restrictive. Same numerals are used for representing same respective elements in the drawings.

With reference to FIG. 1 for a schematic view of a refractive index distribution film of the present invention, the refractive index distribution film 1 comprises a liquid crystalline molecule and a liquid crystalline polymer, and the refractive index distribution film 1 is flexible. In present embodiment, the refractive index distribution film 1 has an optical axis in a direction of the X-direction. In other embodiments of the present invention, the optical axis of the refractive index distribution film 1 can be in a direction of the Y-direction. The refractive index distribution film 1 of the present invention is made of a liquid crystalline polymer, so that it has the property of birefringence. In other words, the refractive index of incident lights having different polarizations and passing through the refractive index distribution film 1 varies. For example, when a light passes through the refractive index distribution film 1, the polarized light with a polarization direction in X-direction and the polarized light with a polarization direction in Y-direction have different focuses.

It is noteworthy that the refractive index distribution film 1 of present embodiment has a symmetric refractive index distribution in the XY-direction, and the refractive index distribution film 1 in other embodiments of the present embodiment may have an asymmetric refractive index distribution. For better understanding, the manufacturing method of a refractive index distribution film in accordance with embodiments of the present invention is described below.

Figure 2:
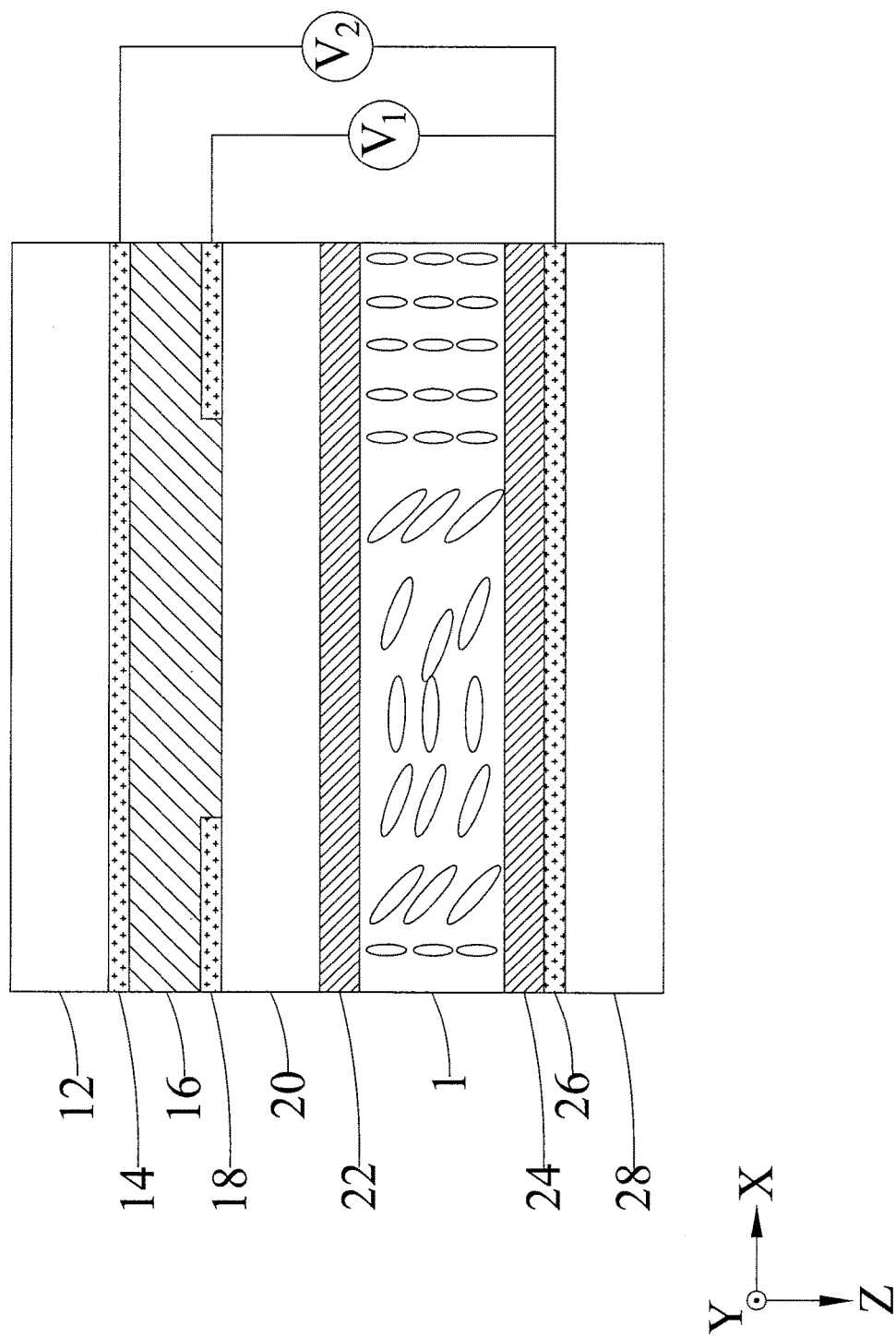
FIG. 2 is a first schematic view of a method of manufacturing a refractive index distribution film in accordance with a preferred embodiment of the present invention.

With reference to FIG. 2 for a first schematic view of a method of manufacturing a refractive index distribution film in accordance with a preferred embodiment of the present invention, a two-voltage structure providing a non-uniform voltage distribution is adopted in this preferred embodiment to manufacture a refractive index distribution film 1 with a refractive index distribution having a circular symmetry.

More specifically, components used for manufacturing a refractive index distribution film include a glass substrate 12, 20, a transparent electrode 14, 18, 26, alignment layer 22, 24 and an insulating layer 16. Wherein, the components used for manufacturing the refractive index distribution film are disposed on the glass substrate 12, the transparent electrode 14, the insulating layer 16, the transparent electrode 18, the glass substrate 20, the alignment layer 22, the alignment layer 24, the transparent electrode 26 and the glass substrate 28 along the Z-direction. The mixture of a liquid crystal and a liquid crystalline polymer used for forming the refractive index distribution film 1 is disposed between the alignment layer 22 and the alignment layer 24. Wherein, the transparent electrode 18 is designed as a circular electrode layer; the transparent electrode 14, 20 is designed as a planar electrode structure; a first voltage $V_1$ is applied between the transparent electrodes 18 and 26, and a second voltage $V_2$ is applied between the transparent electrodes 14 and 26 to form a circular symmetric voltage distribution.

By controlling the magnitude of the first voltage $V_1$ and the second voltage $V_2$, the mixture of the liquid crystal and the liquid crystalline polymer in the refractive index distribution film 1 can be adjusted to form a circular symmetric refractive index distribution. Wherein, the glass substrate 12, 20, 28 of this preferred embodiment can be substituted by a material with high dielectric constant or high impedance.

Figure 3:
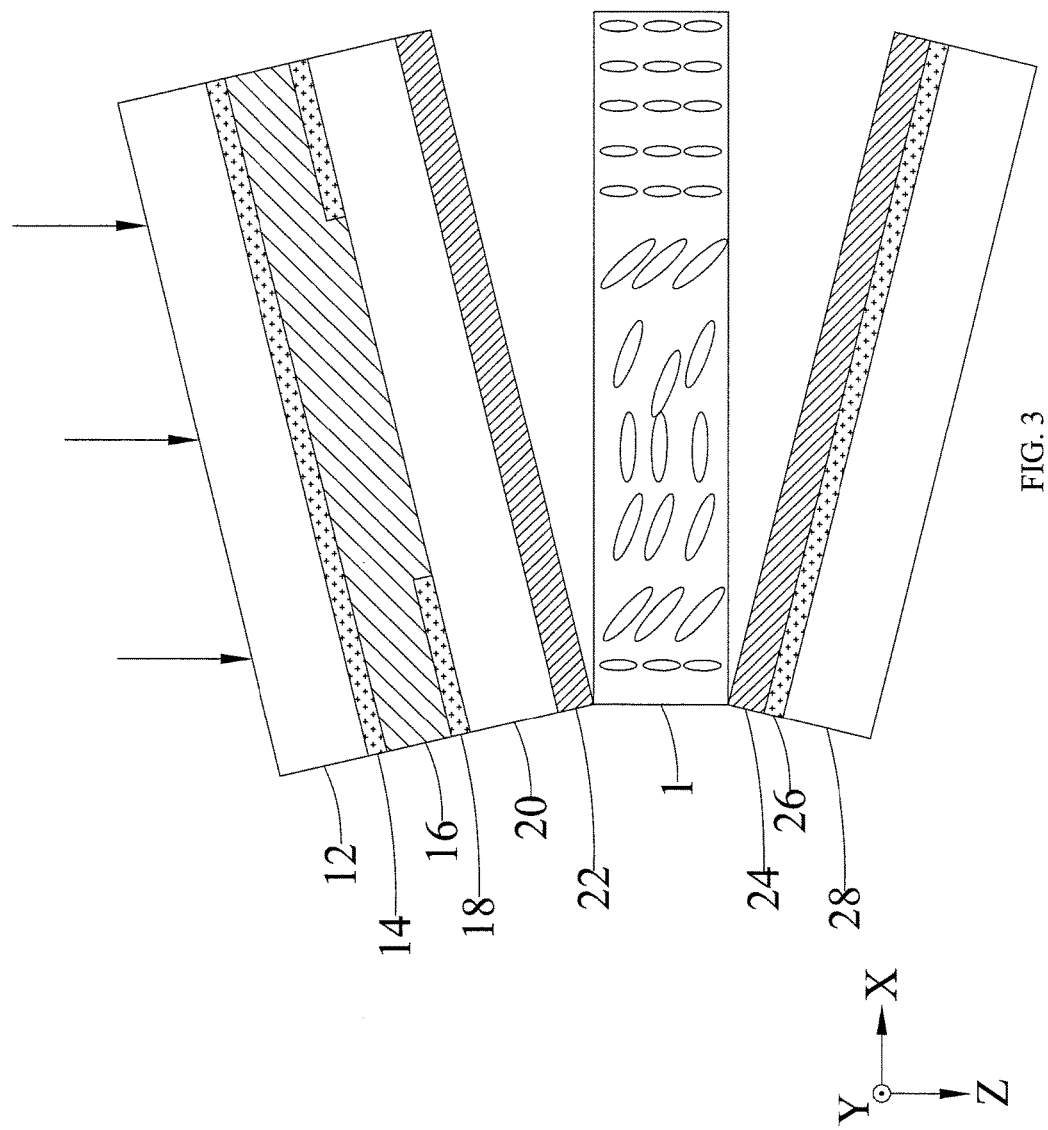
FIG. 3 is a second schematic view of a method of manufacturing a refractive index distribution film in accordance with a preferred embodiment of the present invention.

With reference to FIG. 3 for a second schematic view of a method of manufacturing a refractive index distribution film in accordance with an embodiment of the present invention, an ultraviolet (UV) light exposure can cure the mixture of the liquid crystal and liquid crystalline polymer, and the refractive index distribution film 1 undergoes a phase separation. In other words, the liquid crystal and polymer in the refractive index distribution film 1 are cured and peeled off the refractive index distribution film 1 from the components used for manufacturing the refractive index distribution film 1.

Figure 4:
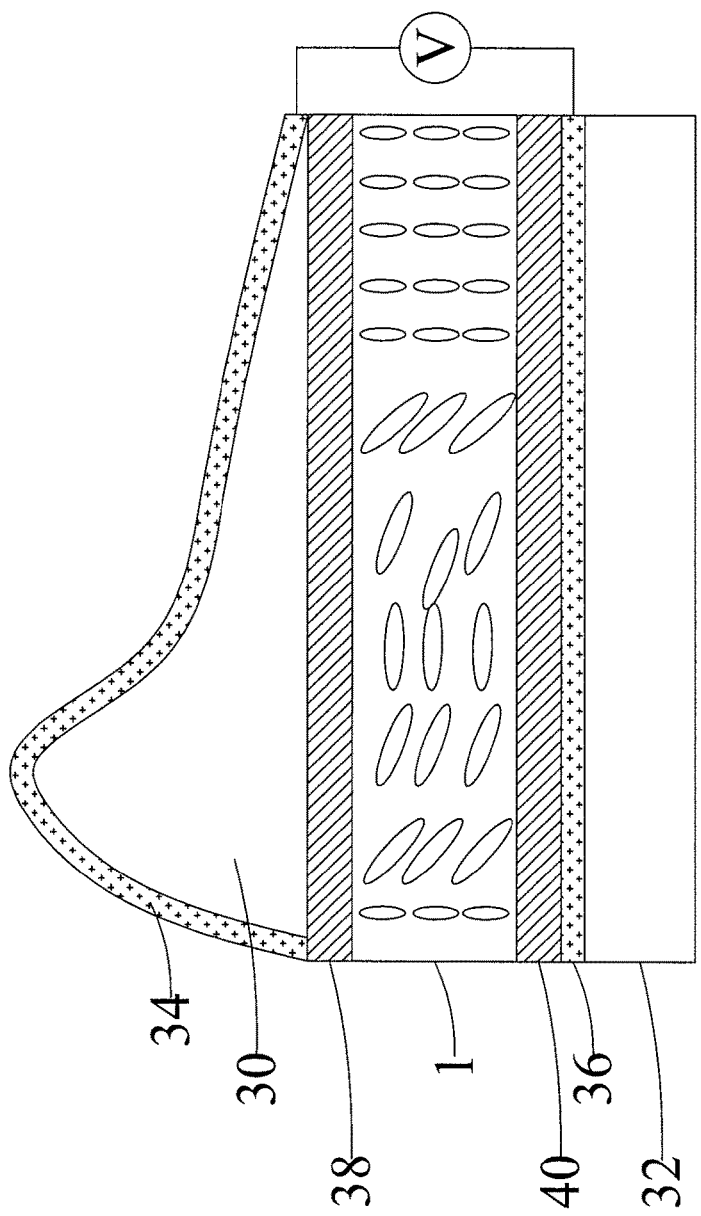
FIG. 4 is a first schematic view of a method of manufacturing a refractive index distribution film in accordance with another preferred embodiment of the present invention.

With reference to FIG. 4 for a first schematic view of a method of manufacturing a refractive index distribution film in accordance with another embodiment of the present invention, the difference between the manufacturing method of this embodiment and the manufacturing method as shown in FIG. 2 resides on this embodiment adopts a circular asymmetric glass substrate to achieve the non-uniform electric field for manufacturing the refractive index distribution film 1 with a non-uniform refractive index distribution.

More specifically, components used for manufacturing a refractive index distribution film include a glass substrate 30, 32, a transparent electrode 34, 36, and an alignment layer 38, 40. Wherein, the components used for manufacturing the refractive index distribution film are disposed along the Z-direction include a transparent electrode 34, a glass substrate 30, an alignment layer 38, an alignment layer 40, a transparent electrode 36 and a glass substrate 32, and a mixture of a liquid crystal and a liquid crystalline polymer used for forming the refractive index distribution film 1 is disposed between the alignment layer 38 and the alignment layer 40. In the present embodiment, a voltage $V_3$ is applied between the transparent electrode 34 and the transparent electrode 36, and the glass substrate 30 is designed thicker on a side and thinner on the other opposite side to achieve a non-uniform electric field distribution. In other words, the electric field at a position on the thicker side is smaller, and the electric field at a position on the thinner side is greater, so that a refractive index distribution film with a gradual refractive index distribution can be manufactured.

In addition to the aforementioned manufacturing method, another method of using a pixel electrode to drive a liquid crystal and a liquid crystalline polymer mixture at different positions in the refractive index distribution film 1 to manufacture a refractive index distribution film with a non-uniform refractive index distribution, such as the aforementioned refractive index distribution film with a gradual and symmetric refractive index distribution or the refractive index distribution film with any refractive index distribution.

Figure 5:
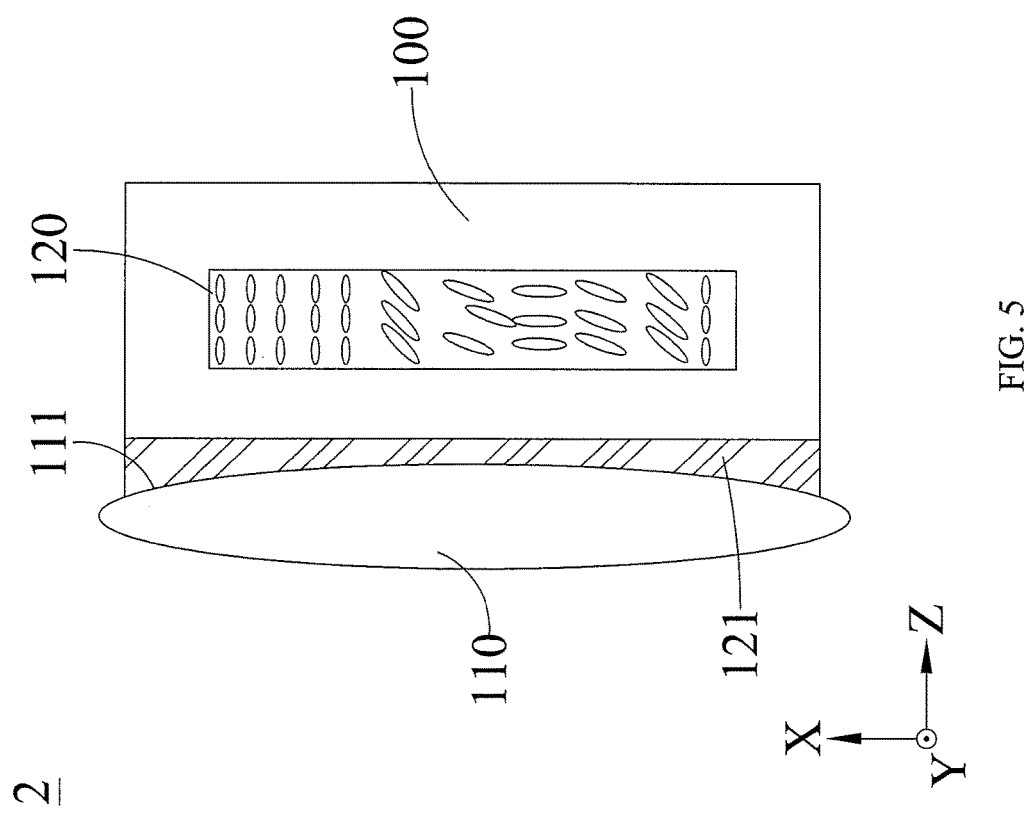
FIG. 5 is a second schematic view of a method of manufacturing a refractive index distribution film in accordance with a first preferred embodiment of the present invention.

With reference to FIG. 5 for a second schematic view of a method of manufacturing a refractive index distribution film in accordance with a first embodiment of the present invention, the liquid crystalline polymer lens structure 2 comprises a flexible substrate 100, a first lens 110 and a first refractive index distribution film 120.

The first refractive index distribution film 120 composed of a liquid crystal and a liquid crystalline polymer having the feature of birefringence is manufactured by the aforementioned method and encapsulated inside a flexible substrate 100. The first refractive index distribution film 120 has a first refractive index in the X-direction and a second refractive index in the Y-direction.

The flexible substrate 100 is a laminating film or a flexible plastic substrate used for packaging the first refractive index distribution film 120. In the present embodiment, after the first refractive index distribution film is packaged inside the flexible substrate 100, and an adhesive 121 can be coated onto a side of the flexible substrate 100 and adhered with a first side 111 of the first lens 110, so that the focal length of the first lens 110 can be adjusted. In industrial applications, the flexible substrate 100 encapsulated with the first refractive index distribution film 120 can be laminated onto a glasses lens for adjusting the power of the glasses.

Figure 6:
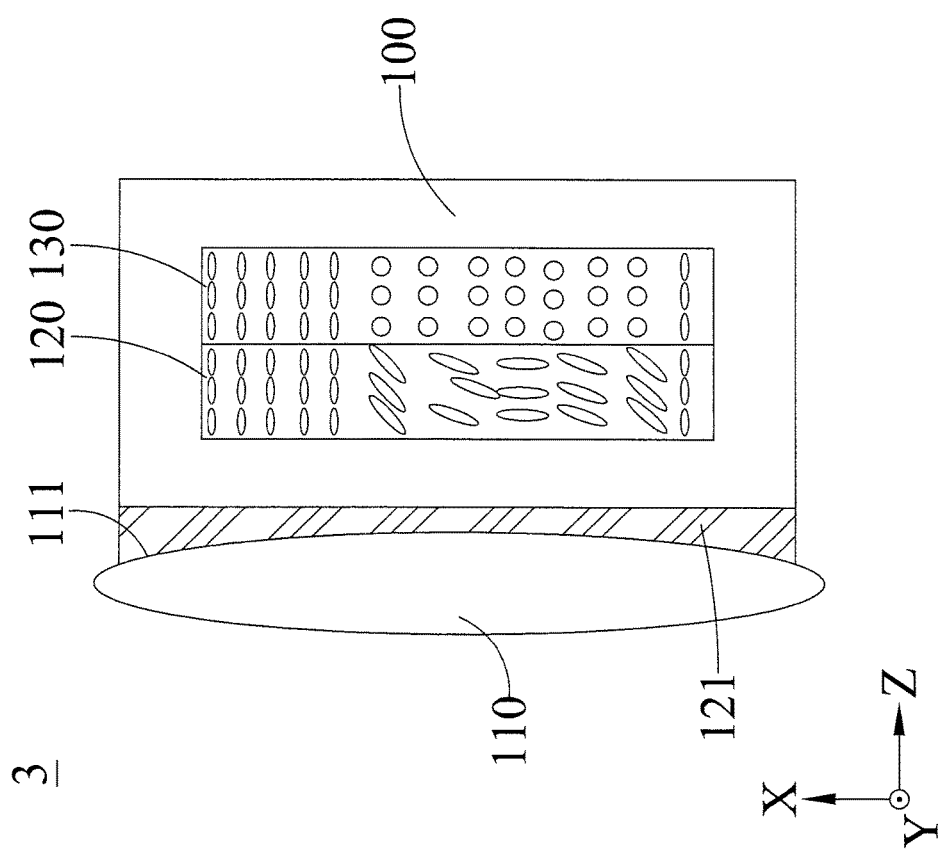
FIG. 6 is a schematic view of a liquid crystalline polymer lens structure in accordance with a second preferred embodiment of the present invention.

With reference to FIG. 6 for a schematic view of a liquid crystalline polymer lens structure in accordance with a second embodiment of the present invention, the difference between the liquid crystalline polymer lens structure 2 of the first embodiment and the liquid crystalline polymer lens structure 3 of the present embodiment resides on that the liquid crystalline polymer lens structure 3 further comprises a second refractive index distribution film 130 which is a mixture of a liquid crystal and a liquid crystalline polymer and encapsulated inside flexible substrate 100 according to the aforementioned method, so that the liquid crystalline polymer lens structure 3 has the feature of birefringence.

The second refractive index distribution film 130 has a third refractive index in the X-direction and the fourth refractive index in the Y-direction.

In the present embodiment, the second refractive index distribution film 130 is encapsulated inside the flexible substrate 100, and the first refractive index distribution film 120 has an optical axis in the X-direction, and the second refractive index distribution film 130 has an optical axis in the Y-direction. Wherein, the flexible substrate 100 can be a laminating film or a flexible plastic film for encapsulating the first refractive index distribution film 120 and the second refractive index distribution film 130. With the two refractive index distribution films 120, 130 with their optical axes perpendicular to each other, the liquid crystalline polymer lens structure 3 of the present embodiment can achieve the expected effect without requiring the polarizer.

Figure 7:
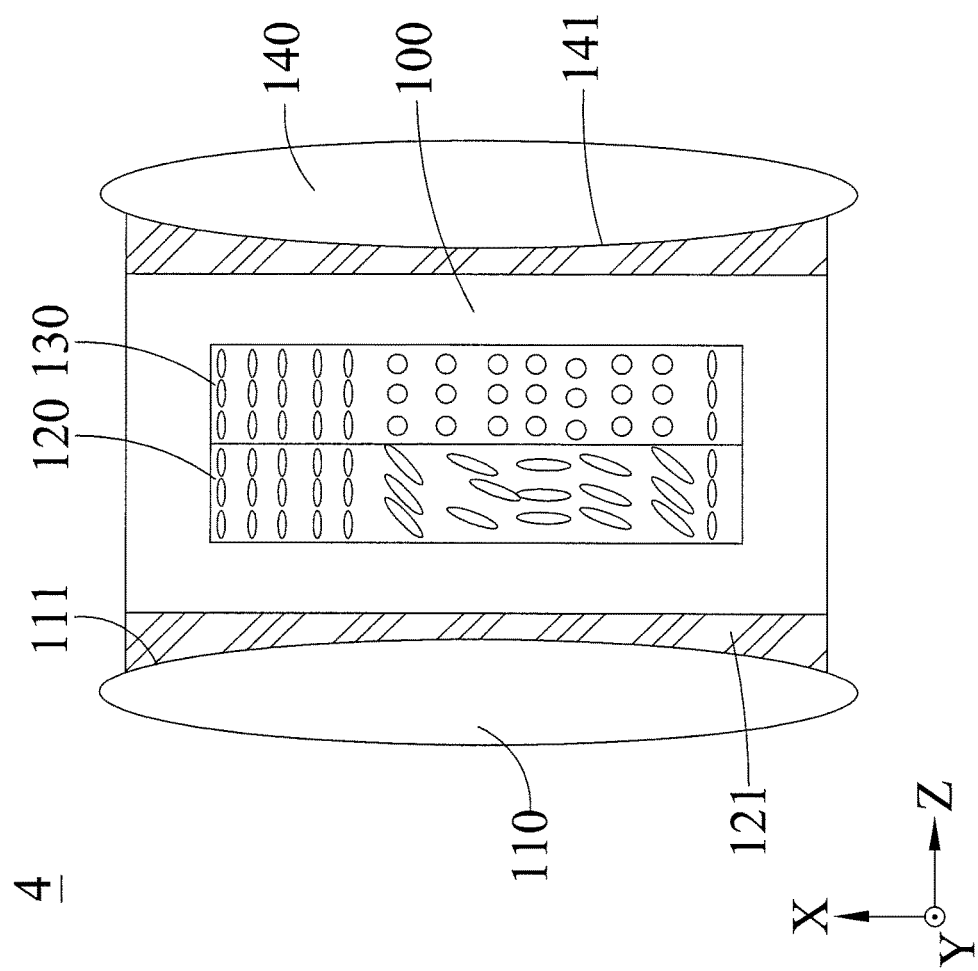
FIG. 7 is a schematic view of a liquid crystalline polymer lens structure in accordance with a third preferred embodiment of the present invention.

With reference to FIG. 7 for a schematic view of a liquid crystalline polymer lens structure in accordance with a third preferred embodiment of the present invention, the major difference between the liquid crystalline polymer lens structure 4 of this preferred embodiment and the liquid crystalline polymer lens structure 3 of the second preferred embodiment resides on that the liquid crystalline polymer lens structure 4 of this preferred embodiment further comprises a second lens 140, and the second lens 140 has a second side 141 opposite to the first side 111 of the first lens 110, and the flexible substrate 100 laminated between the first side 111 and the second side 141 by the adhesive 121.

It is noteworthy that each liquid crystalline polymer lens structure 2, 3, 4 of the first embodiment, the second embodiment and the third embodiment has the first refractive index and the second refractive index of the first refractive index distribution film 120 and the third refractive index and the fourth refractive index of the second refractive index distribution film 130 in the X- and Y-directions, and also has a circular symmetric optical power, a gradual optical power or any refractive index distribution. By adjusting the refractive index distribution of the refractive index distribution film in the X- and Y-directions, the focal length of the lens or the power of glasses can be adjusted.

Figure 8:
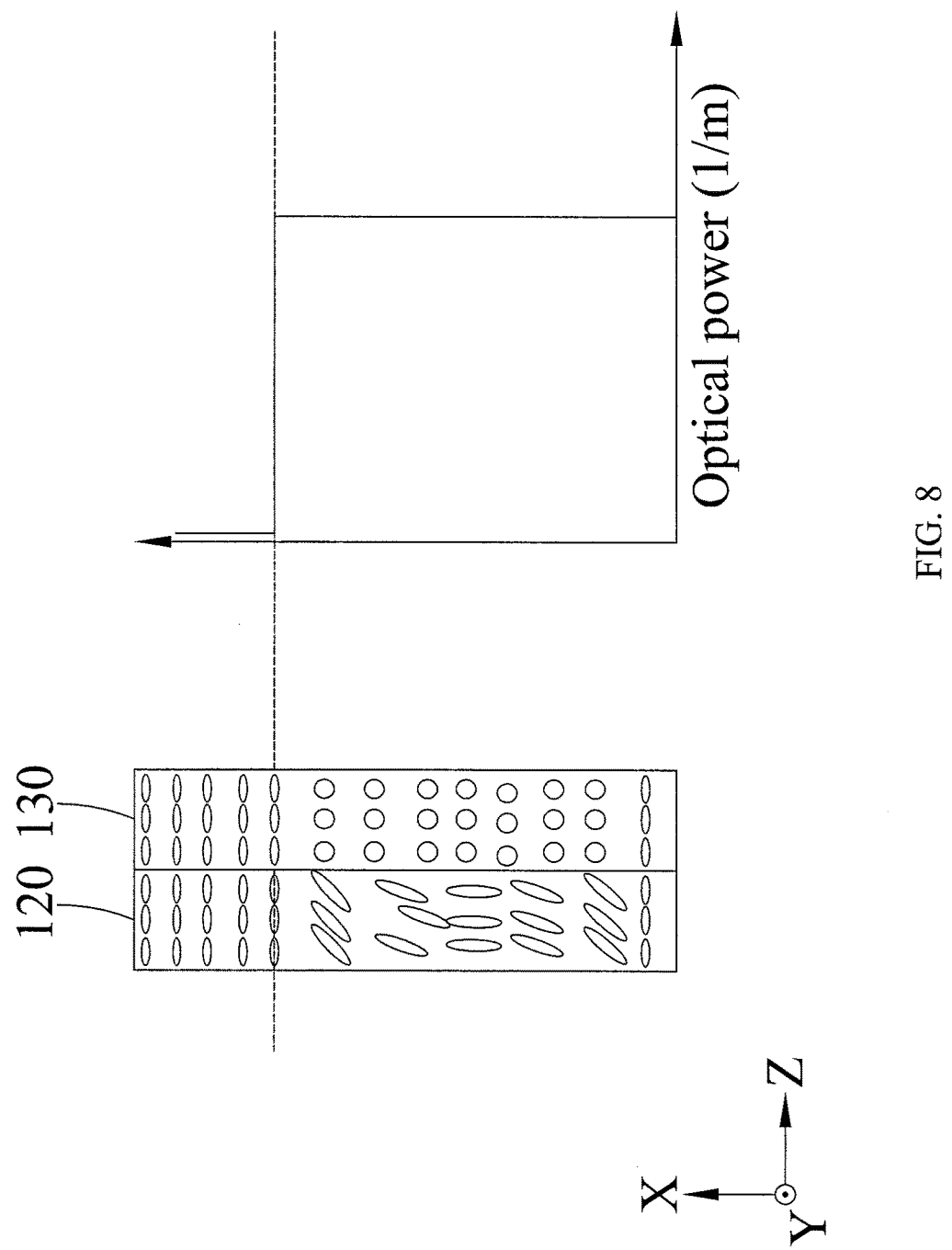
FIG. 8 is a first schematic view showing the lens effect of a liquid crystalline polymer lens structure in accordance with the third preferred embodiment of the present invention.

With reference to FIG. 8 for a first schematic view showing the lens effect of a liquid crystalline polymer lens structure in accordance with the third embodiment of the present invention, the refractive index distribution film manufactured according to the method as shown in FIG. 2 is used as an example. Since the liquid crystalline polymer molecules at the ends of the first refractive index distribution film 120 and the second refractive index distribution film 130 are erected, therefore the refractive index remains unchanged and there is no lens effect. Other parts of the first refractive index distribution film 120 and the second refractive index distribution film 130 have a single lens effect due to the distribution of the liquid crystal molecules.

Figure 9:
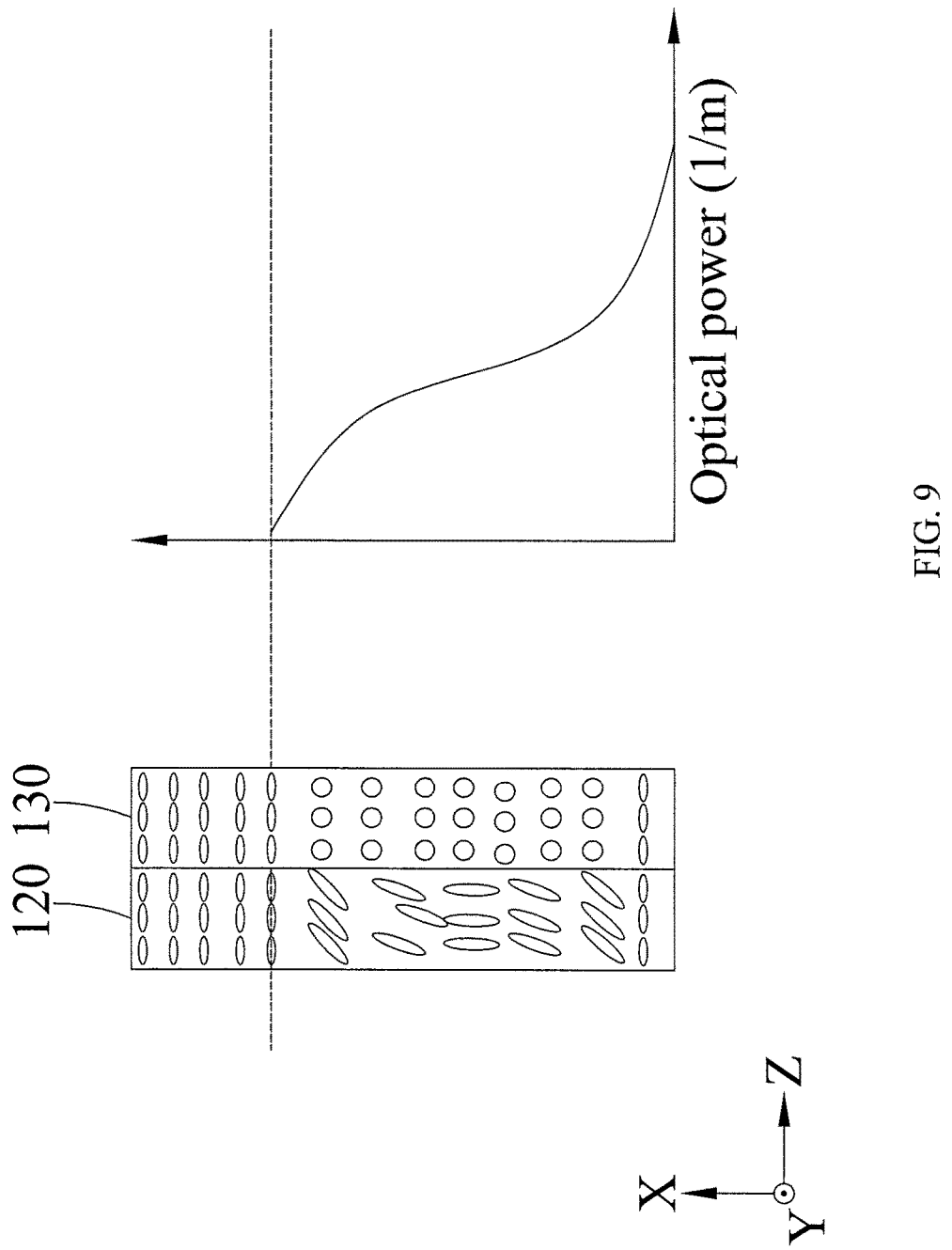
FIG. 9 is a second schematic view showing the lens effect of a liquid crystalline polymer lens structure in accordance with the third preferred embodiment of the present invention.

With reference to FIG. 9 for a second schematic view showing the lens effect of a liquid crystalline polymer lens structure in accordance with the third embodiment of the present invention, the refractive index distribution film manufactured according to the method as shown in FIG. 4 is used as an example. Since the liquid crystalline polymer molecules at the ends of the first refractive index distribution film 120 and the second refractive index distribution film 130 are erected, therefore the refractive index remains unchanged and there is no lens effect. The optical power is increasing gradually along the X-direction for providing additional optical power to improve the presbyopia's reading ability.

Figure 10:
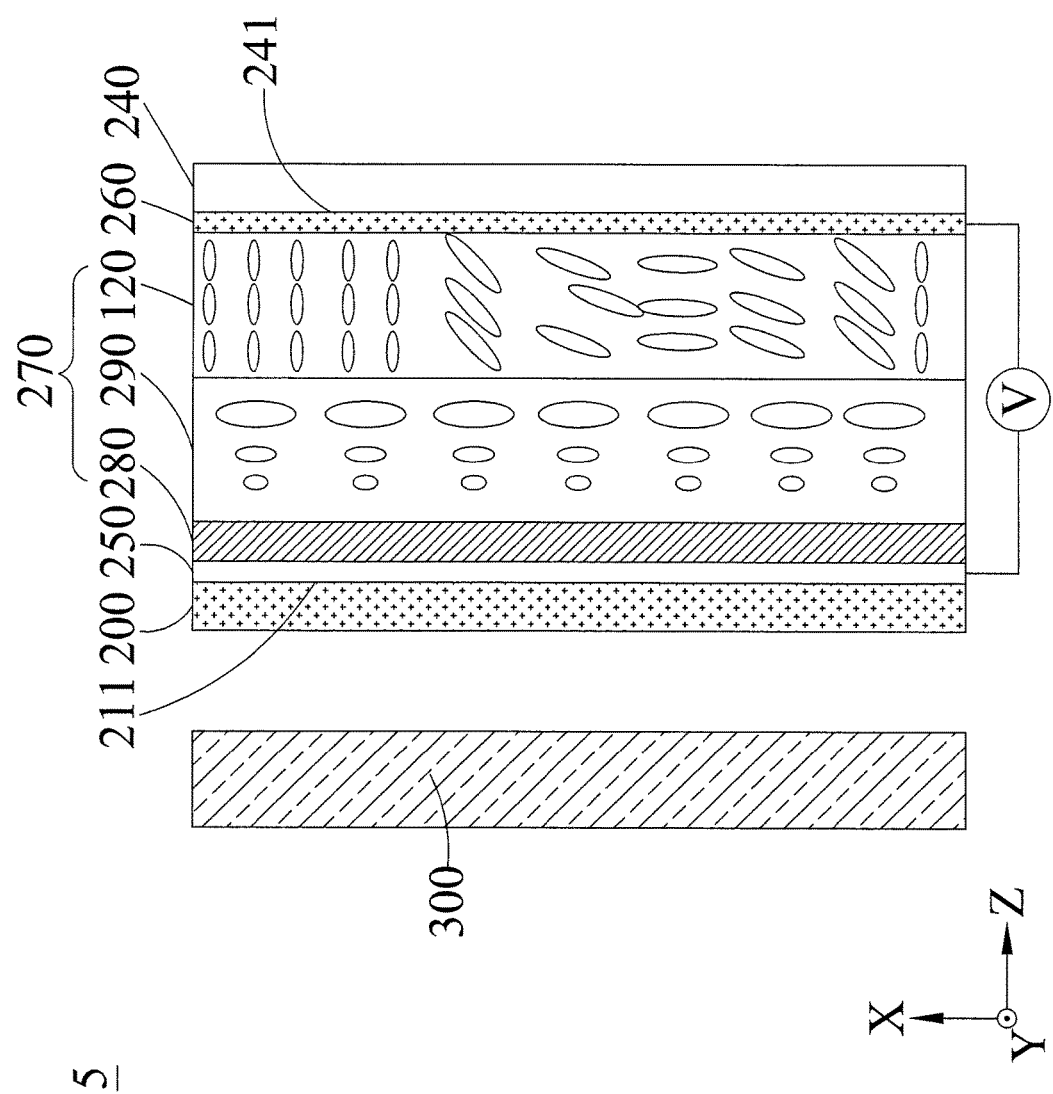
FIG. 10 is a schematic view of a liquid crystalline polymer lens structure in accordance with a fourth preferred embodiment of the present invention.

With reference to FIG. 10 for a schematic view of a liquid crystalline polymer lens structure in accordance with a fourth embodiment of the present invention, the liquid crystalline polymer lens structure 5 comprises a first lens 200, a second lens 240, a first electrode layer 250, a second electrode layer 260 and a composite layer 270. Wherein, the first lens 200 has a first side 211, and the second lens 240 has a second side 241 facing the first side 211. The first electrode layer 250 is disposed on the first side 211 of the first lens 200, and the second electrode layer 260 is disposed on the second side 241 of the second lens 240. The composite layer 270 is disposed between the first electrode layer 250 and the second electrode layer 260, and the composite layer 270, arranged along the direction from the first electrode layer 250 to the second electrode layer 260 (which is the Z-direction), sequentially comprises a first alignment layer 280, a first liquid crystal layer 290 and a first refractive index distribution film 120.

Wherein, the first alignment layer 280 is disposed on the first electrode layer 250, and the first liquid crystal layer 290 is disposed on the first alignment layer 280, and the first refractive index distribution film 120 is disposed on the first liquid crystal layer 290. Wherein, the first refractive index distribution film 120 is the refractive index distribution film manufactured by the aforementioned method and composed of a liquid crystal and a macromolecular polymer, and the first refractive index distribution film has the feature of birefringence.

With the first liquid crystal layer 290 in the composite layer 270 as shown in the figure, if a voltage V is applied between the first electrode layer 250 and the second electrode layer 260, the arrangement of the liquid crystals in the first liquid crystal layer will be affected and rotated, so that the polarization direction of the incident light can be changed, and the focal length of the liquid crystalline polymer lens structure 5 can be changed. If an additional polarizer 300 is added at a position opposite to the first side 211 of the first lens 200, the liquid crystalline polymer lens structure 5 can be used as a signal switch of the optical signal or applied in 3D display technologies.

Figure 11:
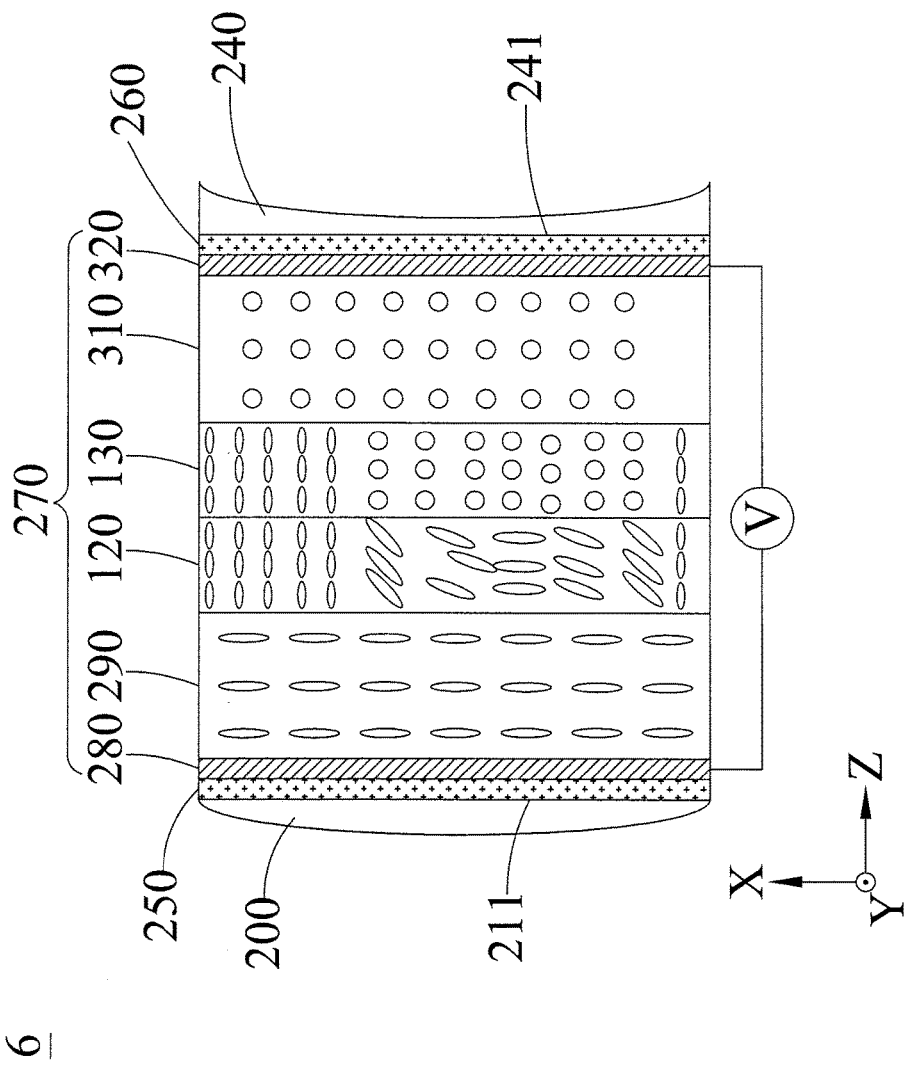
FIG. 11 is a schematic view of a liquid crystalline polymer lens structure in accordance with a fifth preferred embodiment of the present invention.

With reference to FIG. 11 for a schematic view of a liquid crystalline polymer lens structure in accordance with a fifth embodiment of the present invention, the composite layer 270 of the liquid crystalline polymer lens structure 6 along the Z-direction further comprises a second refractive index distribution film 130, a second liquid crystal layer 310 and a second alignment layer 320. Wherein, the second refractive index distribution film 130 is the refractive index distribution film 130 manufactured by the aforementioned method and composed of a liquid crystal and a macromolecular polymer, and the second refractive index distribution film 130 has the feature of birefringence.

The second liquid crystal layer 310 is disposed on the second refractive index distribution film 130, and the second alignment layer 320 is disposed on the second liquid crystal layer 310. Wherein, the alignment direction of the first liquid crystal layer 290 is different from the alignment direction of the second liquid crystal layer 310, and the alignment direction of the first refractive index distribution film 120 is different from the alignment direction of the second refractive index distribution film 130. Since the liquid crystalline polymer distribution film has a dielectric constant distribution and an ability of aligning liquid crystals, therefore this present embodiment with the design of the liquid crystal and the electrode layer can achieve the effect of a dynamic lens. For example, if no voltage is applied between the electrode layers in the present embodiment, the liquid crystalline polymer lens structure 6 will have a constant optical power. On the other hand, if a voltage is applied between the electrode layers, the liquid crystalline polymer lens structure 6 will have a continuous optical power distribution.

It is noteworthy that by adjusting the alignment directions of the first alignment layer 280 and the second alignment layer 320, the first liquid crystal layer 290 or the second liquid crystal layer 310 of the present embodiment can be aligned as an anti-parallel alignment, a vertical alignment, a hybrid alignment or a twisted nematic alignment.

Figure 12:
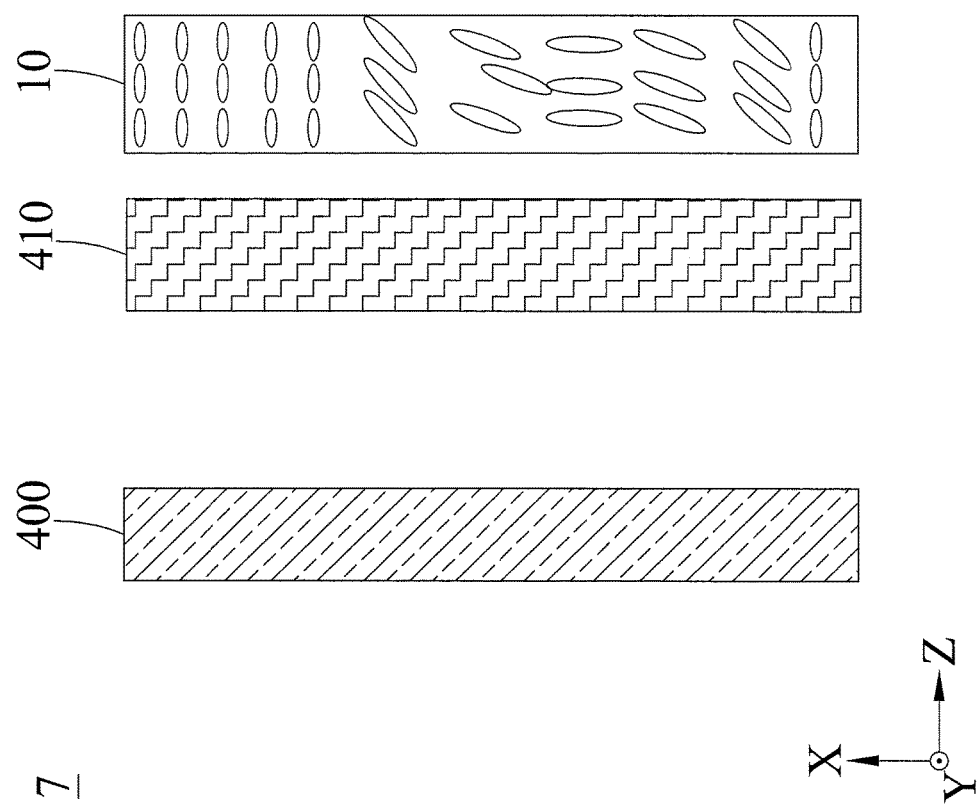
FIG. 12 is a schematic view of a liquid crystalline polymer lens structure in accordance with a sixth preferred embodiment of the present invention.

With reference to FIG. 12 for a schematic view of a liquid crystalline polymer lens structure in accordance with a sixth embodiment of the present invention, the liquid crystalline polymer lens structure 7 comprises a refractive index distribution film 10, a polarizer 400 and a polarization controller 410. The refractive index distribution film 10 is the refractive index distribution film 130 manufactured by the aforementioned method and composed of a liquid crystal and a liquid crystalline polymer, and the refractive index distribution film 10 has the feature of birefringence.

The polarizer 400 is installed on a side of the refractive index distribution film 10, and the polarization controller 410 is installed between the polarizer 400 and the refractive index distribution film 10. Wherein, the polarization controller 410 is used for changing the polarization direction of a polarized light passing through the polarizer 400 in order to change the focal length of the liquid crystalline polymer lens structure 7. For example, if the polarization controller 410 changes the polarization direction of the polarized light passing through the polarizer 400 from the X-direction to the Y-direction or vice versa, the liquid crystalline polymer lens structure 7 will have two different optical power distributions.

In one embodiment, the refractive index distribution film may be utilized to compensate the aberration generated by an optical module. Referring to FIG. 13A and FIG. 13B, FIG. 13A and FIG. 13B are schematic diagrams illustrating an optical system with an aberration compensation function of the present invention. As shown in the figures, the optical system 8 comprises an optical module 80 and a refractive index distribution film 10. The optical module 80 has a curved surface, such as numeral 81 and 82, and the optical module can be a single element or an element comprising at least two components, wherein the optical module comprises a lens or a curved reflector. The refractive index distribution film 10 comprises a liquid crystal and a liquid crystalline polymer, wherein a refractive index distribution of the refractive index distribution film 10 is asymmetric and the tilt angle of the liquid crystal of the refractive index distribution film is fixed and cannot be changed by an external electronic device. The refractive index distribution film 10 is arranged on a first side 81 or a second side 82 of the optical module 80. In one embodiment, the refractive index distribution film 10 is directly adhered on the first side 81 or a second side 82 of the optical module 80; and the first side 81 is a light entrance surface of the optical module 80 and the second side 82 is a light exit surface of the optical module 80. In another embodiment, the refractive index distribution film 10 can be modularly attached on the first side 81 or a second side 82 of the optical module 80 (as shown in FIG. 13A and 13B, position $P_1$) An incident light $L_{in}$ can pass through the refractive index distribution film 10 and the optical module 80 to compensate the aberration generated by the optical module 80. Besides, due to the refractive index distribution film 10 is flexible, the refractive index distribution film 10 can be easily and smoothly attached on the curved surface of the optical module.

Continuing the above description, in one embodiment, the optical module comprises a free form lens. As shown in FIG. 14A and 14B, the optical module 80 comprises the free form lens 800 and a see-through corrector 810. The see-through corrector 810 is attached on a third side 803 of the free form lens 800. As shown in FIG. 14A, the refractive index distribution film 10 is arranged on the first side (light entrance surface) 801 (position $P_2$) of the free form lens 800. It can be understood that the refractive index distribution film 10 also can be attached on the second side (light exit surface) 803 of the free form lens (such as shown in FIG. 14B, position $P_2$). As abovementioned description, the refractive index distribution film 10 can be directly adhered on the light entrance surface or the light exit surface (as shown in FIG. 14A and 14B, position $P_2$), or modularly attached on the first side 801 or the second side 802 (shown in FIG. 14A and 14B, position $P_1$). An incident light $L_{in}$ passes through the free form lens 800 from the first side 801, and the incident light $L_{in}$ is reflected by the second side 802 and the third side 803 to pass through the second side 802 of the free forth lens 800. The refractive index distribution film 10 is utilized to set on the light entrance surface 801 or the light exit surface 802 to compensate the aberration generated from the incident light, which is an off-axis light or has a large incident angle, passing through the optical module.

Figures 15A, 15B:
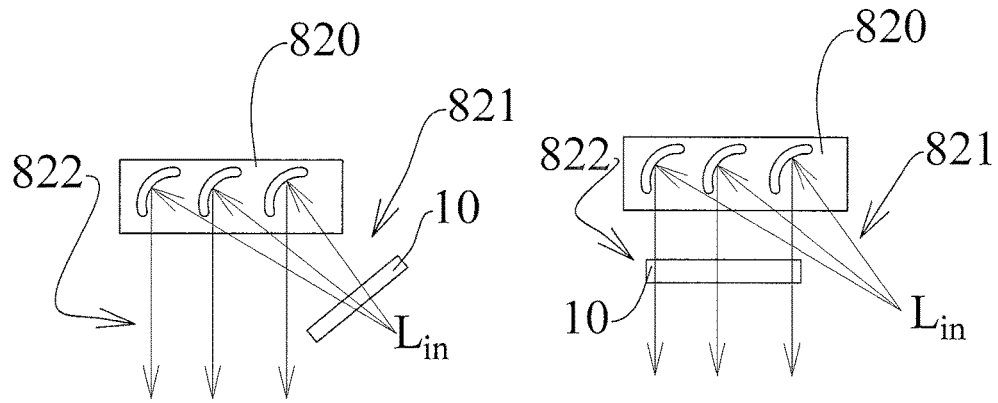
FIG. 15A and FIG. 15B are schematic diagrams illustrating an optical system with an aberration compensation function in accordance with one embodiment of the present invention.

In another embodiment, the optical module of the optical system comprises a curved reflector. Referring to FIG. 15A and 15B, take a curved reflector array 820 for example, the refractive index distribution film 10 is arranged on the first side (light entrance surface) 821 or the second side (light exit surface) 822 of the curved reflector array 820.

Figures 16A, 16B:
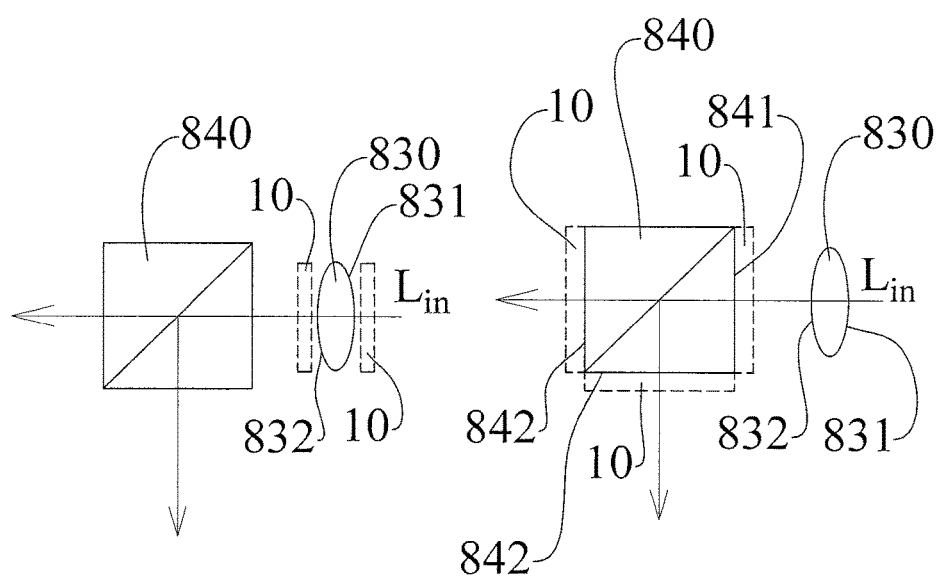
FIG. 16A and FIG. 16B are schematic diagrams illustrating an optical system with an aberration compensation function in accordance with one embodiment of the present invention.

In yet another embodiment, the optical module of the optical system comprises a lens and a beam splitter. Referring to FIG. 16A and 16B, the lens 830 is set on a light entrance side of the beam splitter 840; and the refractive index distribution film 10 is arranged on the first side (light entrance surface) 831 or the second side (light exit surface) 832 of the lens 830. As shown in FIG. 16B, the refractive index distribution film 10 also can be arranged on the first side (light entrance surface) 841 or the second side (light exit surface) 842 of the beam splitter 840.

Figure 17A:
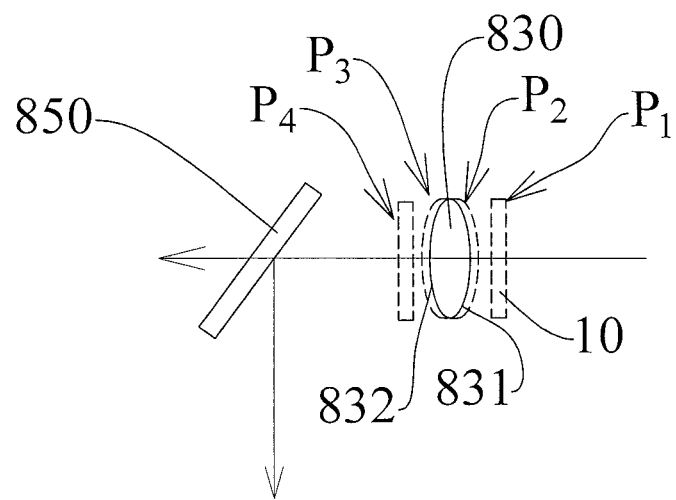
FIG. 17A and FIG. 17B are schematic diagrams illustrating an optical system with an aberration compensation function in accordance with one embodiment of the present invention.
Figure 17B:
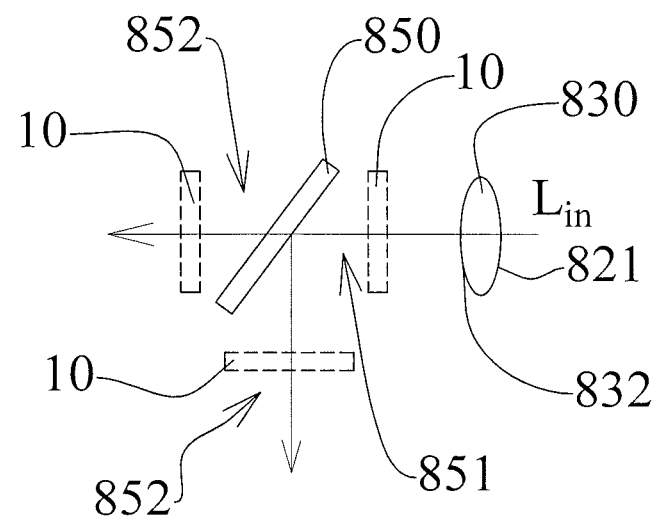

In yet another embodiment, the optical module of the optical system comprises a lens and a reflector. Referring to FIG. 17A and 17B, the lens 830 is set on a light entrance side of the reflector 850; and the refractive index distribution film 10 is arranged on the first side (light entrance surface) 831 (position $P_1$ and $P_2$) or the second side (light exit surface) 832 (position $P_3$, $P_4$) of the lens 830. As shown in FIG. 17B, the refractive index distribution film 10 also can be set on a first side (light entrance side) 851 or a second side (light exit side) 852 of the reflector 850.

Figure 18A:
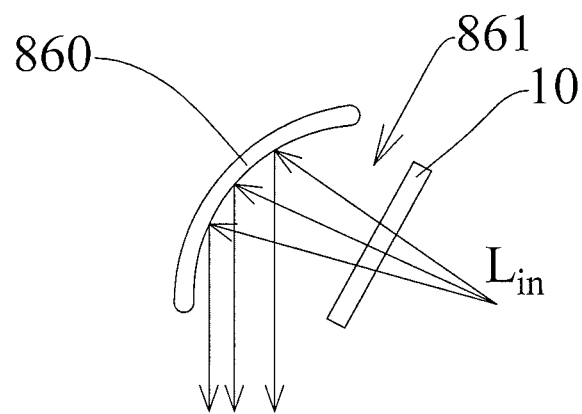
FIG. 18A and FIG. 18B are schematic diagrams illustrating an optical system with an aberration compensation function in accordance with one embodiment of the present invention.
Figure 18B:
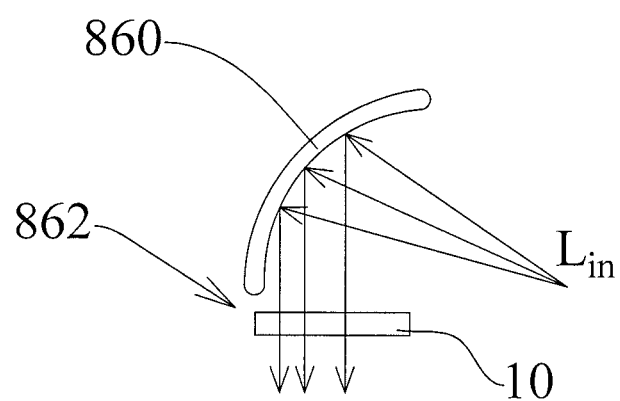

In yet another embodiment, the optical module of the optical system comprises a curved mirror. As shown in FIG. 18A and 18B, the refractive index distribution film 10 is arranged on the first side (light entrance surface) 861 or the second side (light exit surface) 862 of the curved mirror 860.

In one embodiment, the display system comprises an optical system and an image panel, in one embodiment, the display system comprises but not limited to a head-mount display. The optical system comprises an optical module and a refractive index distribution film, wherein the optical module comprises a curved surface, such as a lens or a curved reflector. The refractive index distribution film comprises a liquid crystal and a liquid crystalline polymer, wherein a refractive index distribution of the refractive index distribution film is asymmetric; the refractive index distribution film is arranged on a first side or a second side of the optical module; and the refractive index distribution film is utilized to compensate the aberration generated by the optical module. The image panel for displaying an image, wherein the image panel set on a light entrance side of the optical system, and the image light projected from the image panel passes through the optical system to a viewer's eyes. In one embodiment, the refractive index distribution film is attached on a first side (light entrance surface) or a second side (light exit surface) of the optical module.

Figure 19A:
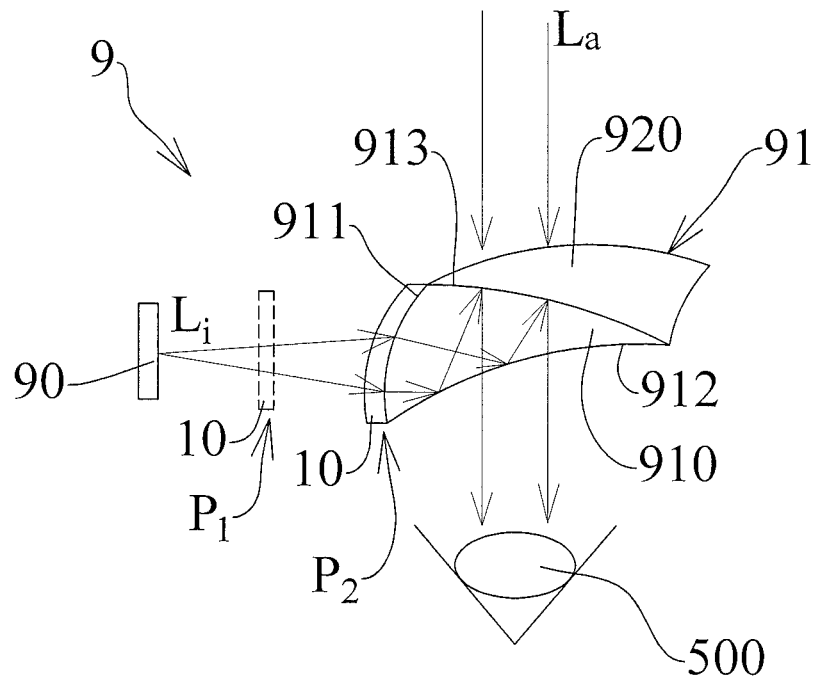
FIG. 19A and FIG. 19B are schematic diagrams illustrating a display system with an aberration compensation function in accordance with one embodiment of the present invention.
Figure 19B:
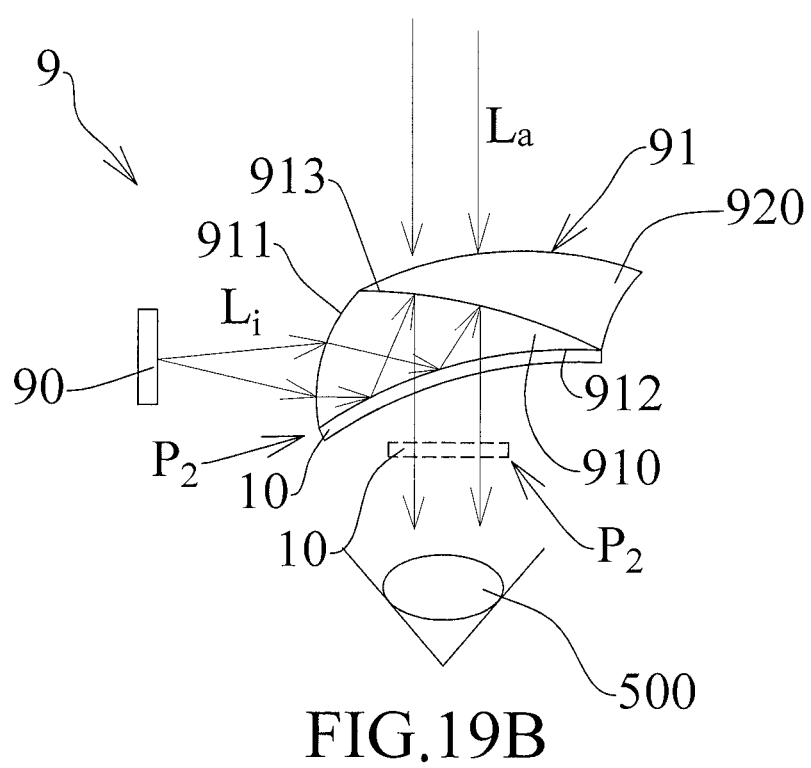

Continuing the above description, in one embodiment, the lens comprises a free form lens. As shown in FIG. 19A and 19B, FIG. 19A and FIG. 19B are schematic diagrams illustrating a display system 9 with an aberration compensation function of the present invention. In the embodiment, the display system comprises an image panel 90 and an optical system 91, and the optical module 91 comprises the free form lens 910 and a see-through corrector 920. The see-through corrector 920 is attached on a third side 913 of the free form lens 910. As shown in FIG. 19A, the refractive index distribution film 10 is arranged on the first side (light entrance surface) 911 (may be set on position $P_1$ or position $P_2$) of the free form lens 910. It can be understood that the refractive index distribution film 10 also can be attached on the second side (light exit surface) 912 of the free form lens 910 (such as shown in FIG. 19B, may be set on position $P_1$ or position $P_2$). An image light $L_i$ passes through the free form lens 910 from the first side 911, and the image light $L_i$ is reflected by the second side 912 and the third side 913 to pass through the second side 912 of the free form lens 910. Due to the margin of the panel is the incident light having a large incident angle for the optical element, the aberration is generated by the optical module. The refractive index distribution film 10 is utilized to set on the light entrance surface 911 or the light exit surface 912 to compensate the aberration generated from the incident light, which is an off-axis light or has a large incident angle, passing through the optical module. Besides, the see-through corrector 920 set on the third side 913 is utilized to compensate the image distortion generated by an ambient light $L_a$.

Figure 20A:
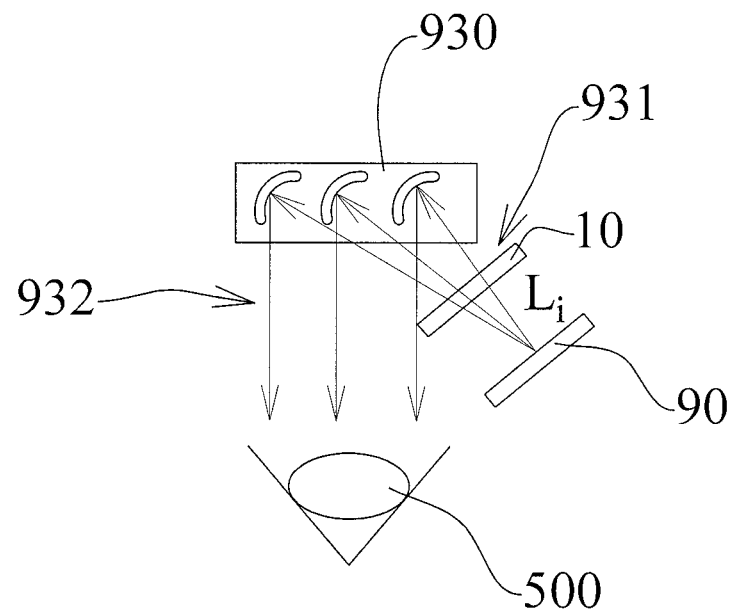
FIG. 20A and FIG. 20B are schematic diagrams illustrating a display system with an aberration compensation function in accordance with one embodiment of the present invention.
Figure 20B:
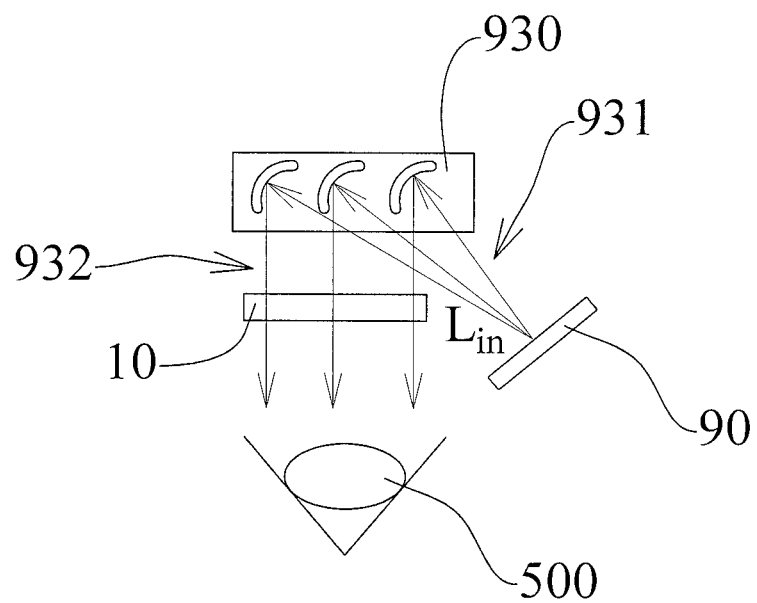

In another embodiment, the optical module of the display system comprises a curved reflector. Referring to FIG. 20A and 20B, take a curved reflector array 930 for example, the refractive index distribution film 10 is attached on the first side (light entrance side) 931 or the second side (light exit side) 932 of the curved reflector array 930. The image light $L_i$ projected from the image panel 90 passes through the optical module 91 and the refractive index distribution film 10 to reflect into a viewer's eyes 500; and the refractive index distribution film 10 is utilized to compensate the aberration generated by the optical system 91.

Figure 21A:
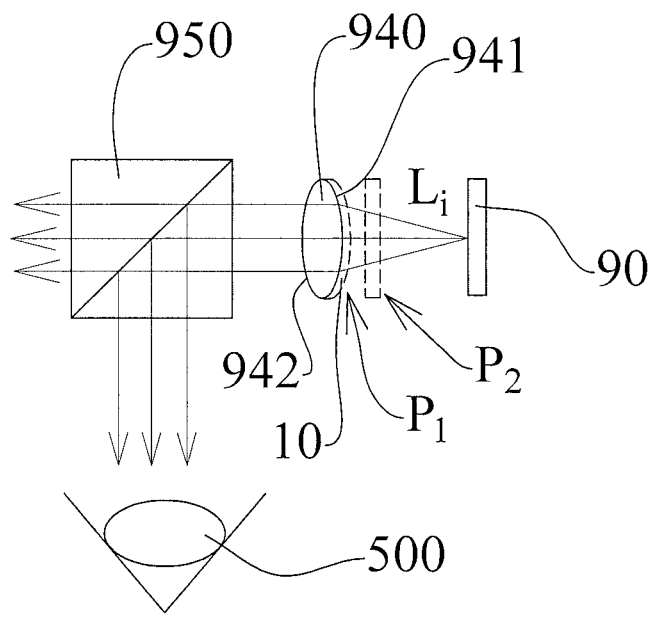
FIG. 21A, FIG. 21B, FIG. 21C and FIG. 21D are schematic diagrams illustrating a display system with an aberration compensation function in accordance with one embodiment of the present invention.
Figure 21B:
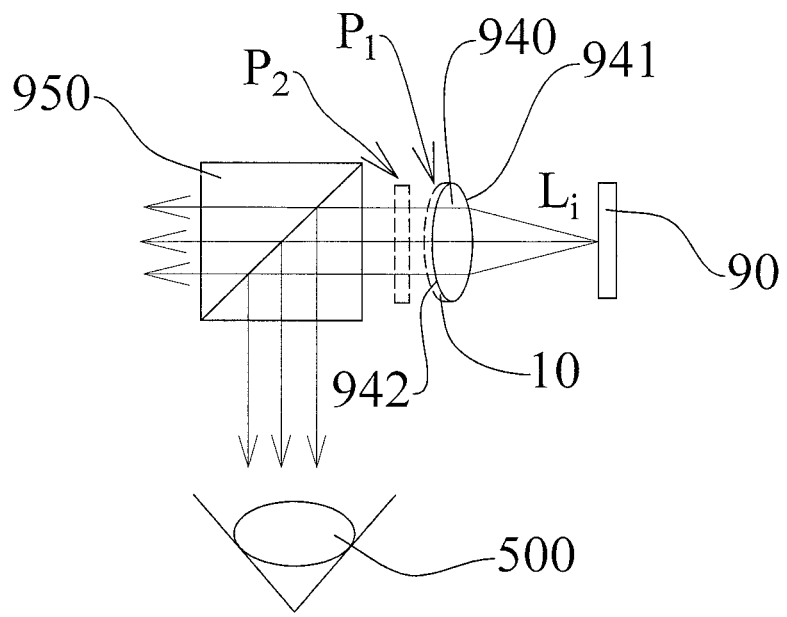
Figure 21C:
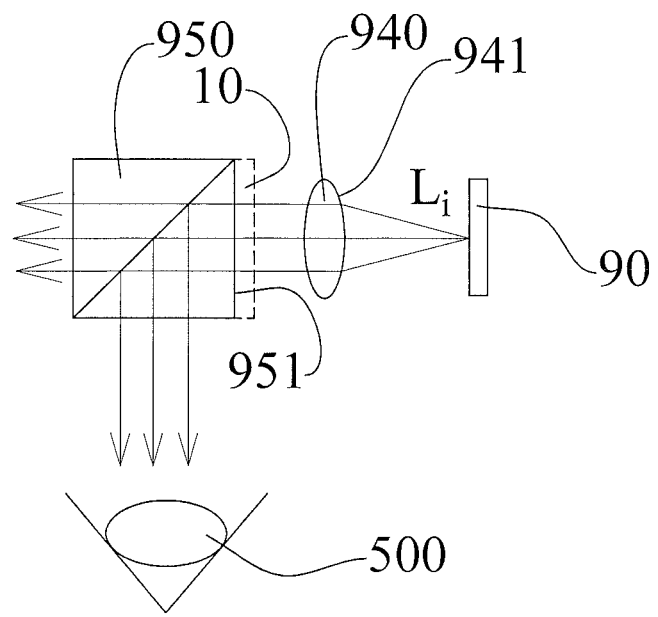
Figure 21D:
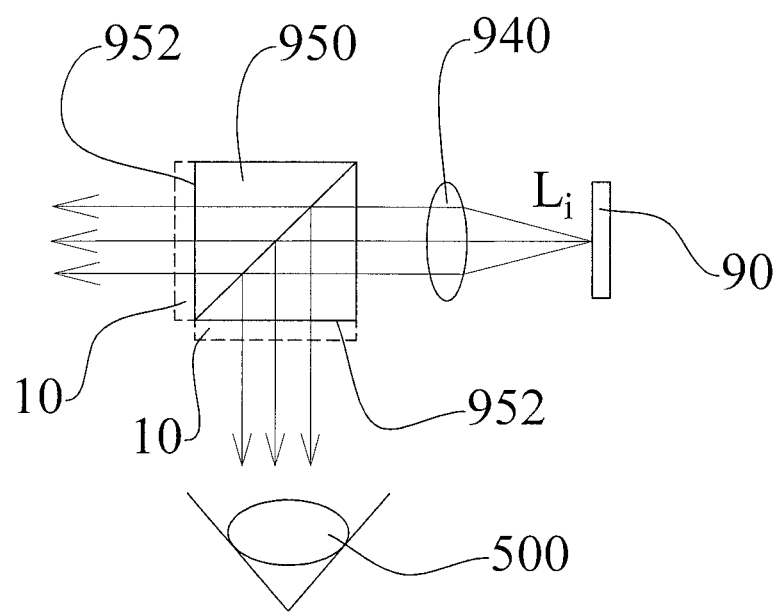

In yet another embodiment, the optical module of the display system comprises a lens and a beam splitter. Referring to FIG. 21A and 21B, the lens 940 is set on a light entrance side of the beam splitter 950; and the refractive index distribution film 10 is arranged on the first side (light entrance surface) 941 or the second side (light exit surface) 942 (may be adhered on position $P_1$ or attached on position $P_2$) of the lens 940. As shown in FIG. 21C and FIG. 21D, the refractive index distribution film 10 also can be attached on the first side (light entrance surface) 951 or the second side (light exit surface) 952 of the beam splitter 950.

Figure 22A:
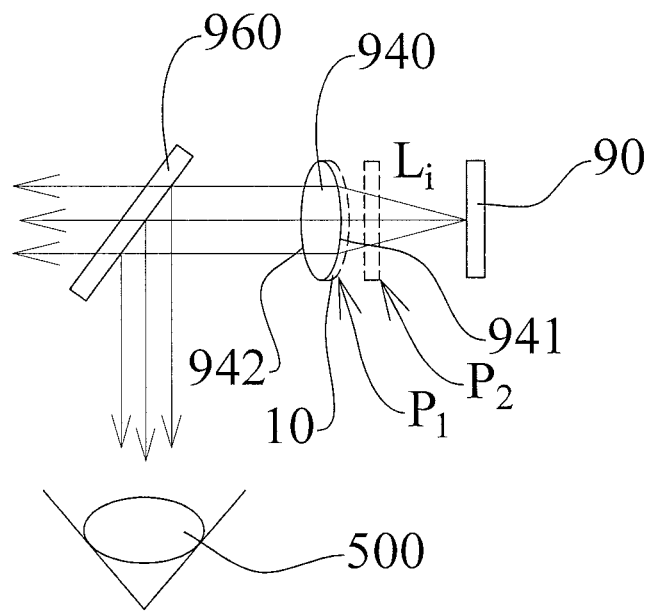
FIG. 22A, FIG. 22B, FIG. 22C and FIG. 22D are schematic diagrams illustrating a display system with an aberration compensation function in accordance with one embodiment of the present invention.
Figure 22B:
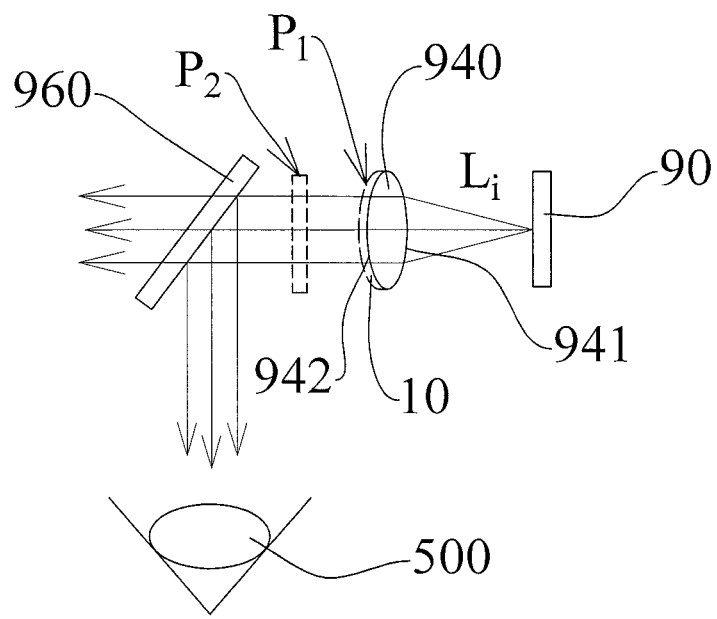
Figure 22C:
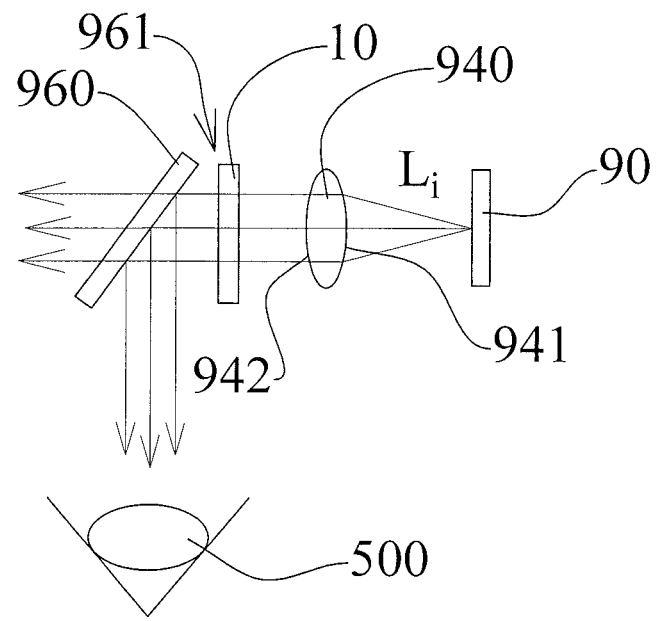
Figure 22D:
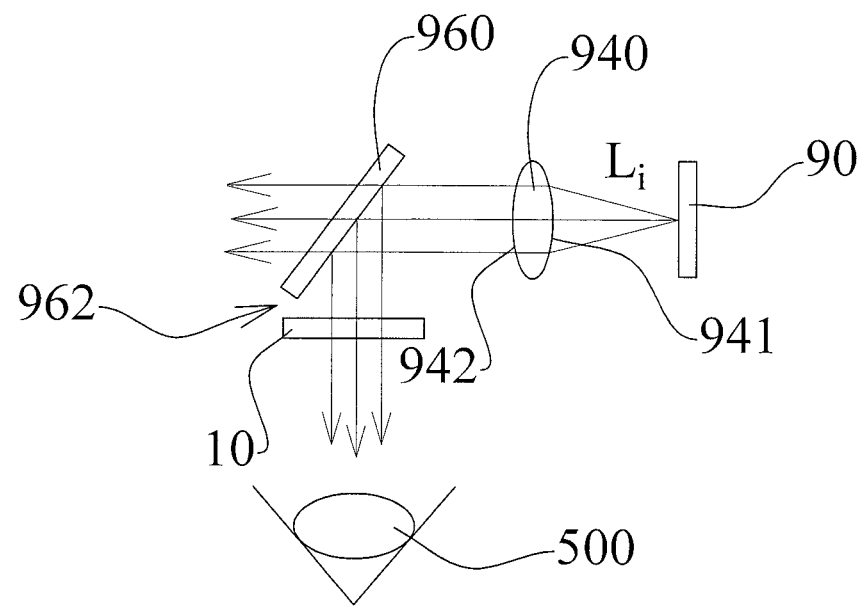

In yet another embodiment, the optical module of the display system comprises a lens and a reflector. Referring to FIG. 22A and 22B, the lens 940 is set on a light entrance side of the reflector 960; and the refractive index distribution film 10 is arranged on the first side (light entrance surface) 941 or the second side (light exit surface) 942 (may be adhered on position P₁ or attached on position P₂) of the lens 940. As shown in FIG. 22C and FIG. 22D, the refractive index distribution film 10 also can be set on a first side (light entrance side) 961 or a second side (light exit side) 962 of the reflector 960.

Figure 23A:
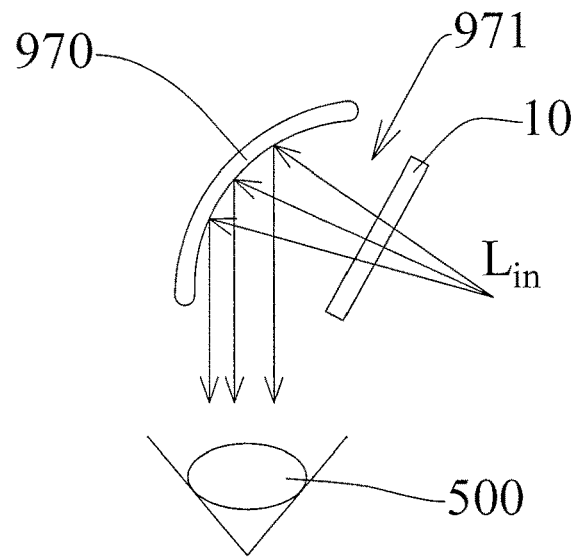
FIGS. 23A and 23B are schematic diagrams illustrating a display system with an aberration compensation function in accordance with one embodiment of the present invention.
Figure 23B:
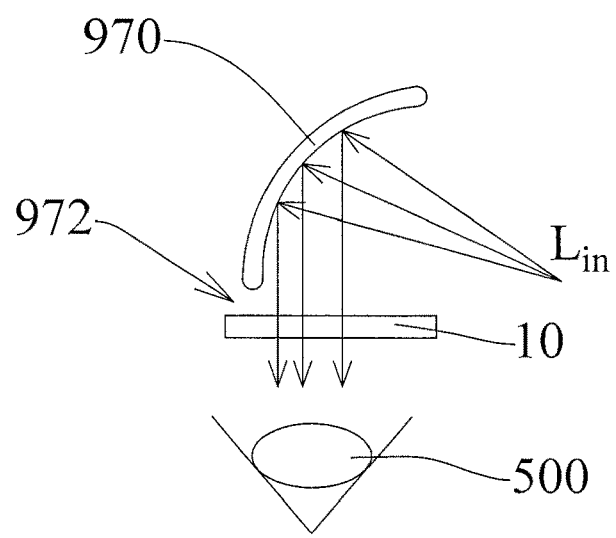

In yet another embodiment, the optical module of the display system comprises a curved mirror. As shown in FIG. 23A and 23B, the refractive index distribution film 10 is arranged on the first side (light entrance surface) 971 or the second side (light exit surface) 972 of the curved mirror 970.

In summation of the description above, the refractive index distribution film has a plurality of the refractive index distribution and the tilt angle of the liquid crystal of the refractive index distribution film is fixed and cannot be changed by an external electronic device. Due to no additional electrically-controlled component is needed to change the refractive index distribution, the production cost can be reduced substantially. Besides, the refractive index distribution film can be encapsulated by a flexible substrate and laminated onto a glasses lens for changing the power of glasses, providing additional optical power for a presbyopia's reading ability. Moreover, the refractive index distribution film can be adhered onto or attached on an optical module to compensate the aberration generated by the optical module which has an off-axis incident light or has a large incident angle. Therefore, the refractive index distribution film of the present invention can be applied onto various kinds of lenses or curved reflector easily or laminated onto an optical module to act as a simple and convenient lens sticker.

While the means of specific embodiments in present invention has been described by reference drawings, numerous modifications and variations could be made thereto by those skilled in the art without departing from the scope and spirit of the invention set forth in the claims.

What is claimed is:

1. A display system with an aberration compensation function, comprising:
   an optical system, comprising:
      an optical module comprising a first side and a second side, wherein the optical module comprises a free form lens and a see-through corrector, the free form lens has three sides and the see-through corrector is attached on one of the three sides, and another two sides are configured as a light entrance side and an light exit side, a first side and a second side of the optical module are respectively the light entrance side and the light exit side, and the light exit from the free form lens after reflections between the light exit side and the side of the see-through corrector; and
      a refractive index distribution film comprising a liquid crystal and a liquid crystalline polymer, wherein a refractive index distribution of the refractive index distribution film is asymmetric and the tilt angle of the liquid crystal of the refractive index distribution film is fixed; the refractive index distribution film is arranged on the first side or the second side of the optical module; and the refractive index distribution film is utilized to compensate the aberration generated by the optical module; and
   an image panel for displaying an image, wherein the image panel set on a light entrance side of the optical system, and the image light projected from the image panel passes through the optical system to a viewer's eyes.

2. A display system with an aberration compensation function, comprising:
   an optical system, comprising:
      an optical module comprising a first side and a second side, wherein the optical module comprises a lens and a beam splitter, a light enters from the lens and exits from the beam splitter, the first side of the optical module is one of both sides of the lens, and the second side of the optical module is one of both sides of the beam splitter; and
      a refractive index distribution film comprising a liquid crystal and a liquid crystalline polymer, wherein a refractive index distribution of the refractive index distribution film is asymmetric and the tilt angle of the liquid crystal of the refractive index distribution film is fixed; the refractive index distribution film is arranged on the first side or the second side of the optical module; and the refractive index distribution film is utilized to compensate the aberration generated by the optical module; and
   an image panel for displaying an image, wherein the image panel set on a light entrance side of the optical system, and the image light projected from the image panel passes through the optical system to a viewer's eyes.

3. A display system with an aberration compensation function, comprising:
   an optical system, comprising:
      an optical module comprising a first side and a second side, wherein the optical module comprises a curved reflector array, a light enters from one side of the curved reflector array and exits from another side, the first side of the optical module is one of both sides of the curved reflector array, and the second side is another side; and
      a refractive index distribution film comprising a liquid crystal and a liquid crystalline polymer, wherein a refractive index distribution of the refractive index distribution film is asymmetric and the tilt angle of the liquid crystal of the refractive index distribution film is fixed; the refractive index distribution film is attached on the first side or the second side of the optical module; and the refractive index distribution film is utilized to compensate the aberration generated by the optical module; and
   an image panel for displaying an image, wherein the image panel set on a light entrance side of the optical system, and the image light projected from the image panel passes through the optical system to a viewer's eyes.

4. The display system according to claim 1, wherein the refractive index distribution film is flexible.

5. The display system according to claim 1, wherein the refractive index distribution film is directly adhered on the first side or the second side of the optical module.

* * * * *